US011738742B2

(12) United States Patent
Komuro et al.

(10) Patent No.: US 11,738,742 B2
(45) Date of Patent: Aug. 29, 2023

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Misa Komuro, Wako (JP); Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 266 days.

(21) Appl. No.: 17/069,917

(22) Filed: Oct. 14, 2020

(65) Prior Publication Data

US 2021/0114588 A1    Apr. 22, 2021

(30) Foreign Application Priority Data

Oct. 18, 2019  (JP) .................................. 2019-191025

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 30/143;
(Continued)

(56) References Cited

U.S. PATENT DOCUMENTS

2021/0053561 A1*  2/2021  Beller .................... G08G 1/166

FOREIGN PATENT DOCUMENTS

JP    2010-079425        4/2010
JP    2011-197781        10/2011
(Continued)

OTHER PUBLICATIONS

Schneemann, Friederike, and Irene Gohl. "Analyzing driver-pedestrian interaction at crosswalks: A contribution to autonomous driving in urban environments." 2016 IEEE intelligent vehicles symposium (IV). IEEE, 2016. (Year: 2016).*

(Continued)

*Primary Examiner* — Russell Frejd
*Assistant Examiner* — Ana D Thomas
(74) *Attorney, Agent, or Firm* — Amin, Turocy & Watson, LLP

(57) ABSTRACT

A vehicle control device includes a recognizer configured to recognize a surrounding environment of a vehicle, a setter configured to set a first risk area in a surrounding area of the vehicle on the basis of a recognition result of the recognizer, and a controller configured to control at least one of a speed and steering of the vehicle. The setter sets the first risk area so that the first risk area includes an area between the moving object and a first end of a crosswalk where the moving object is scheduled to arrive in the crosswalk when the moving object is entering the crosswalk which is provided in front of the vehicle and where the vehicle is scheduled to pass on the basis of the recognition result of the recognizer. The controller prevents the vehicle from entering the first risk area when a first predetermined condition is satisfied.

10 Claims, 15 Drawing Sheets

(51) Int. Cl.
*B60W 10/20* (2006.01)
*B60W 60/00* (2020.01)
*B60W 30/14* (2006.01)
*B60W 10/18* (2012.01)

(52) U.S. Cl.
CPC ...... *B60W 30/0956* (2013.01); *B60W 30/143* (2013.01); *B60W 60/0017* (2020.02); *B60W 2420/42* (2013.01); *B60W 2420/52* (2013.01); *B60W 2552/45* (2020.02)

(58) Field of Classification Search
CPC ......... B60W 60/0017; B60W 2420/42; B60W 2420/52; B60W 2552/45; B60W 2552/53; B60W 2554/4029; B60W 2554/4041; B60W 2720/106
See application file for complete search history.

(56) References Cited

FOREIGN PATENT DOCUMENTS

| JP | 2013-117807 | | 6/2013 | |
|---|---|---|---|---|
| JP | 2019188791 | * | 10/2019 | ............ B60W 40/04 |
| JP | 2021-62768 A | * | 4/2021 | ............ B60W 30/08 |

OTHER PUBLICATIONS

Rasouli, Amir, Iuliia Kotseruba, and John K. Tsotsos. "Understanding pedestrian behavior in complex traffic scenes." IEEE Transactions on Intelligent Vehicles 3.1 (2017): 61-70. (Year: 2017).*
Japanese Office Action for Japanese Patent Application No. 2019-191025 dated Dec. 6, 2022.

* cited by examiner

FIG. 7

| AREA | CONDITION OF STOP OR LIKE |
|---|---|
| THERE IS FIRST RISK AREA (THERE IS NO INTERFERENCE WITH SECOND RISK AREA) | ASSUMED DECELERATION IS LESS THAN FIRST THRESHOLD VALUE |
| THERE IS FIRST RISK AREA (THERE IS INTERFERENCE WITH SECOND RISK AREA) | NO EXCEPTIONS (STOP OR AVOIDANCE) |

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2019-191025, filed Oct. 18, 2019, the content of which is incorporated herein by reference.

BACKGROUND

Field

The present invention relates to a vehicle control device, a vehicle control method, and a storage medium.

Description of Related Art

In recent years, research has been conducted on automatedly controlling vehicles. A device for setting risk potential of a host vehicle in a direction opposite to a movement direction of a moving object to be lower when the moving object is closer to an end of a passing section while the moving object around the vehicle is moving in a predetermined passing section has been disclosed (Japanese Unexamined Patent Application, First Publication No. 2011-197781).

However, the above-described device may not be able to perform suitable driving with respect to a moving object.

SUMMARY

The present invention has been made in consideration of such circumstances and an objective of the present invention is to provide a vehicle control device, a vehicle control method, and a storage medium for enabling more suitable driving to be performed with respect to a moving object.

A vehicle control device, a vehicle control method, and a storage medium according to the present invention adopt the following configurations.

(1): According to an aspect of the present invention, a vehicle control device is provided including: a recognizer configured to recognize a surrounding environment of a vehicle; a setter configured to set a first risk area in a surrounding area of the vehicle on the basis of a recognition result of the recognizer; and a controller configured to control at least one of speed and steering of the vehicle, wherein the setter sets the first risk area so that the first risk area includes an area between the moving object and a first end of a crosswalk where the moving object is scheduled to arrive in the crosswalk when the moving object is entering the crosswalk which is provided in front of the vehicle and where the vehicle is scheduled to pass on the basis of the recognition result of the recognizer and wherein the controller prevents the vehicle from entering the first risk area when a first predetermined condition is satisfied.

(2): In the above-described aspect (1), the first predetermined condition is that deceleration related to the vehicle is less than a threshold value when it is assumed that the vehicle is controlled so that the vehicle does not enter the first risk area.

(3): In the above-described aspect (1) or (2), the setter sets a second risk area including the moving object and located around the moving object on the basis of presence of the moving object and the controller controls the vehicle on the basis of the first risk area and the second risk area.

(4): In the above-described aspect (3), the first predetermined condition is that deceleration related to the vehicle is less than a threshold value when it is assumed that the vehicle is controlled so that the vehicle does not enter the first risk area and the controller prevents the vehicle from entering the second risk area when it is assumed that the vehicle will enter the second risk area in a state in which the first predetermined condition is not satisfied.

(5): In any one of the above-described aspects (1) to (4), the setter sets the first risk area so that the first risk area does not include a specific area between the moving object and a second end opposite to the first end in the crosswalk.

(6): In any one of the above-described aspects (1) to (5), the setter sets the first risk area when the moving object is about to enter the crosswalk and the controller prevents the vehicle from entering the first risk area when a second predetermined condition is satisfied.

(7): According to an aspect of the present invention, a vehicle control method is provided including: recognizing, by a computer, a surrounding environment of a vehicle; setting, by the computer, a first risk area in a surrounding area of the vehicle on the basis of a recognition result; controlling, by the computer, at least one of a speed and steering of the vehicle; setting, by the computer, the first risk area so that the first risk area includes an area between the moving object and a first end of a crosswalk where the moving object is scheduled to arrive in the crosswalk when the moving object is entering the crosswalk which is provided in front of the vehicle and where the vehicle is scheduled to pass on the basis of the recognition result; and preventing, by the computer, the vehicle from entering the first risk area when a first predetermined condition is satisfied.

(8): According to an aspect of the present invention, a storage medium is provided storing a program for causing a computer to execute processing steps of: recognizing a surrounding environment of a vehicle; setting a first risk area in a surrounding area of the vehicle on the basis of a recognition result; controlling at least one of a speed and steering of the vehicle; setting the first risk area so that the first risk area includes an area between the moving object and a first end of a crosswalk where the moving object is scheduled to arrive in the crosswalk when the moving object is entering the crosswalk which is provided in front of the vehicle and where the vehicle is scheduled to pass on the basis of the recognition result; and preventing the vehicle from entering the first risk area when a first predetermined condition is satisfied.

According to the aspects (1) to (8), because the controller prevents the vehicle from entering the first risk area when the first predetermined condition is satisfied, the controller can perform more suitable driving with respect to the moving object.

According to the aspect (4), because the controller further prevents the vehicle from entering the second risk area, the vehicle can be reliably controlled according to the surrounding situation.

According to the aspect (6), the controller further controls the vehicle according to an intention of the moving object, thereby performing more suitable driving with respect to the moving object.

BRIEF DESCRIPTION OF THE DRAWINGS

FIG. 1 is a configuration diagram of a vehicle system using a vehicle control device according to an embodiment.

FIG. 7 is a diagram for describing conditions when a host vehicle M stops in front of a crosswalk CW and when the host vehicle M passes through the crosswalk CW.

DETAILED DESCRIPTION

Hereinafter, embodiments of a vehicle control device, a vehicle control method, and a storage medium according to the present invention will be described with reference to the drawings. Although a case in which left-hand traffic regulations are applied will be described below, it is only necessary to reverse the left and right when right-hand traffic regulations are applied. As used throughout this disclosure, the singular forms "a," "an," and "the" include plural reference unless the context clearly dictates otherwise.

[Overall Configuration]

Figure 1:
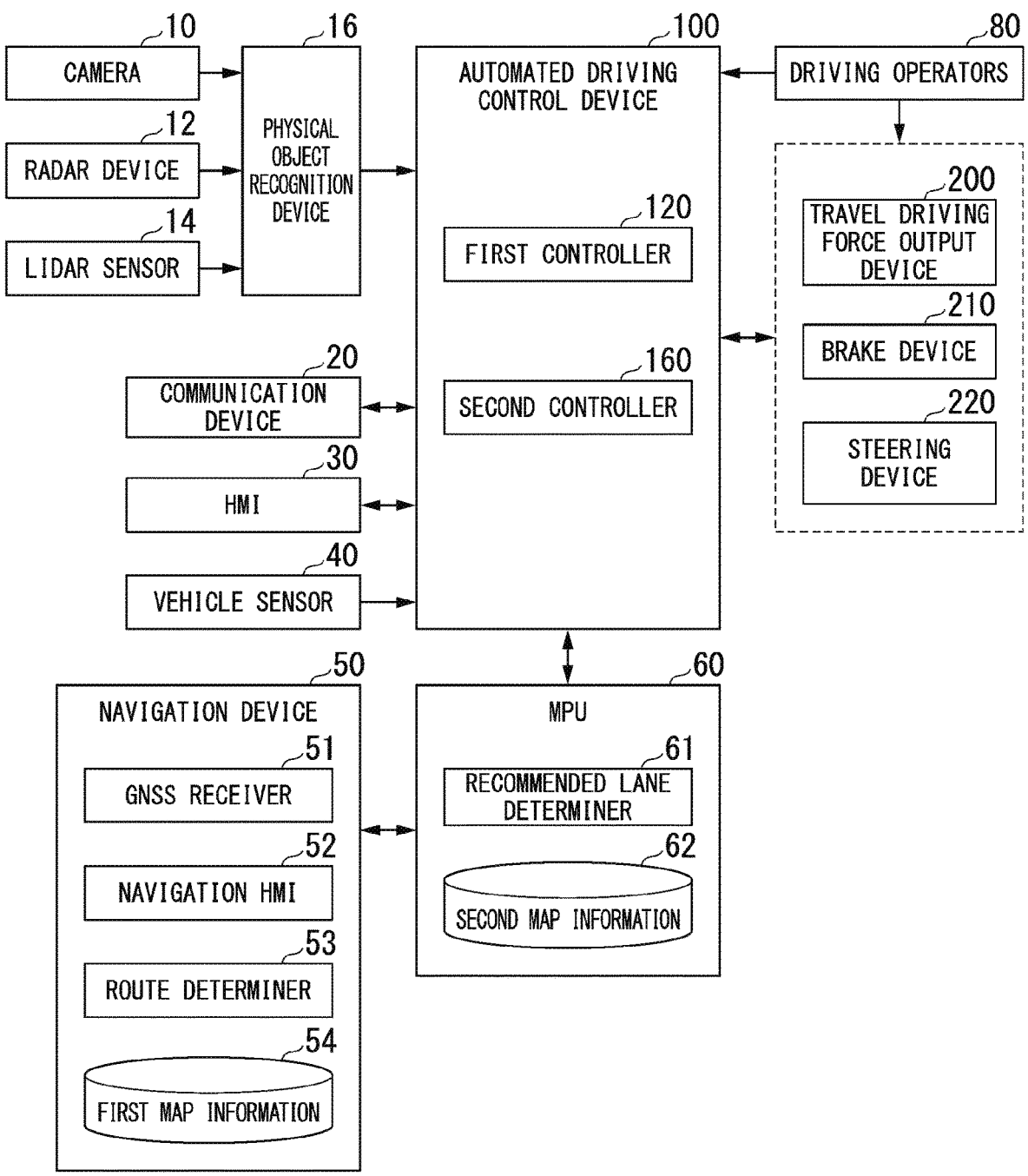

FIG. 1 is a configuration diagram of a vehicle system 1 using a vehicle control device according to an embodiment. For example, a vehicle in which the vehicle system 1 is mounted is a two-wheeled vehicle, a three-wheeled vehicle, or a four-wheeled vehicle. A driving source of the vehicle is an internal combustion engine such as a diesel engine or a gasoline engine, an electric motor, or a combination thereof. The electric motor is operated using electric power generated by an electric power generator connected to the internal combustion engine or electric power with which a secondary cell or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, driving operators 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. The configuration shown in FIG. 1 is merely an example and parts of the configuration may be omitted or other configurations may be further added.

For example, the camera 10 is a digital camera using a solid-state imaging element such as a charge coupled device (CCD) or a complementary metal oxide semiconductor (CMOS). The camera 10 is attached to any location on the vehicle (hereinafter referred to as a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position (a distance to and a direction) of a physical object by detecting radio waves (reflected waves) reflected by the physical object. The radar device 12 is attached to any location on the host vehicle M. The radar device 12 may detect a position and speed of the physical object in a frequency modulated continuous wave (FM-CW) scheme.

The LIDAR sensor 14 radiates light (or electromagnetic waves having a wavelength close to light) to the vicinity of the host vehicle M and measures scattered light. The LIDAR sensor 14 detects a distance to an object on the basis of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle present in the vicinity of the host vehicle M, or communicates with various types of server devices via a radio base station, using, for example, a cellular network or a Wi-Fi network, Bluetooth (registered trademark), dedicated short range communication (DSRC), or the like.

The HMI 30 presents various types of information to an occupant of the host vehicle M and receives an input operation by the occupant. The HMI 30 includes various types of display devices, a speaker, a buzzer, a touch panel, a switch, keys and the like.

The vehicle sensor 40 includes a vehicle speed sensor configured to detect the speed of the host vehicle M, an acceleration sensor configured to detect acceleration, a yaw rate sensor configured to detect angular velocity around a vertical axis, a direction sensor configured to detect a direction of the host vehicle M, and the like.

For example, the navigation device 50 includes a global navigation satellite system (GNSS) receiver 51, a navigation HMI 52, and a route determiner 53. The navigation device 50 stores first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or corrected by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route determiner 53 determines a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include a curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane determiner 61 and stores second map information 62 in a storage device such as an HDD or a flash memory. The recommended lane determiner 61 divides the route on the map provided from the navigation device 50 into a plurality of blocks (for example, divides the route every 100 [m] in a traveling direction of the vehicle) and determines a recommended lane for each block with reference to the second map information 62. The recommended lane determiner 61 determines in what lane numbered from the left the vehicle will travel. The recommended lane determiner 61 determines the recommended lane so that the host vehicle M can travel along a reasonable route for traveling to a branching destination when there is a branch point in the route on the map.

The second map information 62 is map information which has higher accuracy than the first map information 54. For example, the second map information 62 includes information about a center of a lane, information about a boundary of a lane, and the like. The second map information 62 may include road information, traffic regulations information, address information (an address/postal code), facility information, telephone number information, and the like. The second map information 62 may be updated at any time when the communication device 20 communicates with another device.

For example, the driving operators 80 include an accelerator pedal, a brake pedal, a shift lever, a steering wheel, a steering wheel variant, a joystick, and other operators. A sensor configured to detect an amount of operation or the presence or absence of an operation is attached to the driving operator 80, and a detection result thereof is output to the automated driving control device 100 or some or all of the travel driving force output device 200, the brake device 210, and the steering device 220.

The automated driving control device 100 includes, for example, a first controller 120 and a second controller 160. Each of the first controller 120 and the second controller 160 is implemented, for example, by a hardware processor such as a central processing unit (CPU) executing a program (software). Some or all of these components are implemented by hardware (a circuit including circuitry) such as a large-scale integration (LSI) circuit, an application specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 is an example of a "vehicle control device" and the combination of an action plan generator 140 and the second controller 160 is an example of a "controller."

Figure 2:
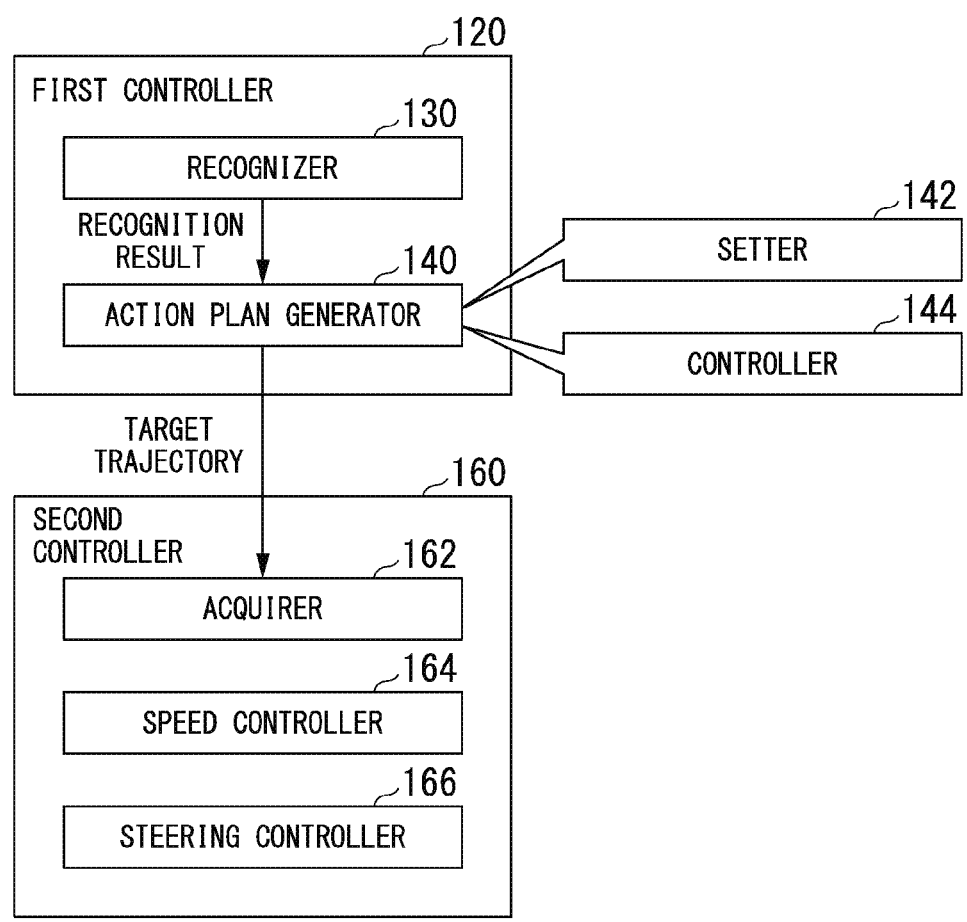
FIG. 2 is a functional configuration diagram of a first controller and a second controller.

FIG. 2 is a functional configuration diagram of the first controller 120 and the second controller 160. The first controller 120 includes, for example, a recognizer 130, and the action plan generator 140. For example, the first controller 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both the recognitions. Thereby, the reliability of automated driving is ensured.

The recognizer 130 recognizes states of a position, a speed, acceleration, and the like of a physical object around the host vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by a represented region. The "state" of a physical object may include acceleration or jerk of the physical object or an "action state" (for example, whether or not a lane change is being made or intended).

For example, the recognizer 130 recognizes a lane in which the host vehicle M is traveling (a travel lane). For example, the recognizer 130 recognizes the travel lane by comparing a pattern of a road dividing line (for example, an arrangement of solid lines and broken lines) obtained from the second map information 62 with a pattern of road dividing lines in the vicinity of the host vehicle M recognized from an image captured by the camera 10. The recognizer 130 may recognize a travel lane by recognizing a traveling path boundary (a road boundary) including a road dividing line, a road shoulder, a curb, a median strip, a guardrail, or the like as well as a road dividing line. In this recognition, a position of the host vehicle M acquired from the navigation device 50 or a processing result of the INS may be added. The recognizer 130 recognizes a temporary stop line, an obstacle, red traffic light, a toll gate, and other road events.

When the travel lane is recognized, the recognizer 130 recognizes a position or orientation of the host vehicle M with respect to the travel lane. For example, the recognizer 130 may recognize a gap of a reference point of the host vehicle M from the center of the lane and an angle formed with respect to a line connecting the center of the lane in the traveling direction of the host vehicle M as a relative position and orientation of the host vehicle M related to the travel lane. Alternatively, the recognizer 130 may recognize a position of the reference point of the host vehicle M related to one side end portion (a road dividing line or a road boundary) of the travel lane or the like as a relative position of the host vehicle M related to the travel lane.

The action plan generator 140 generates a future target trajectory along which the host vehicle M is allowed to automatedly travel (independently of a driver's operation) in the traveling aspect defined by the event so that the host vehicle M can generally travel in the recommended lane determined by the recommended lane determiner 61 and further cope with a surrounding situation of the host vehicle M. For example, the target trajectory includes a speed element. For example, the target trajectory is represented by sequentially arranging points (trajectory points) at which the host vehicle M is required to arrive. The trajectory point is a point at which the host vehicle M is required to arrive for each predetermined traveling distance (for example, about several meters [m]). On the other hand, a target speed and target acceleration for each predetermined sampling time period (for example, about several tenths of a second [sec]) are generated as parts of the target trajectory. The trajectory point may be a position at which the host vehicle M is required to arrive at the sampling time for each predetermined sampling time period. In this case, information of the target speed or the target acceleration is represented by an interval between trajectory points.

The action plan generator 140 may set an automated driving event when the target trajectory is generated. Automated driving events include a constant-speed traveling event, a low-speed tracking traveling event, a lane change event, a branching event, a merging event, a takeover event, and the like. The action plan generator 140 generates a target trajectory according to an activated event.

The action plan generator 140 includes, for example, a setter 142 and a controller 144. Details of the processes of the setter 142 and the controller 144 will be described below.

The second controller 160 controls the travel driving force output device 200, the brake device 210, and the steering device 220 so that the host vehicle M passes through the target trajectory generated by the action plan generator 140 at a scheduled time.

Returning to FIG. 2, the second controller 160 includes, for example, an acquirer 162, a speed controller 164, and a steering controller 166. The acquirer 162 acquires information of a target trajectory (trajectory points) generated by the action plan generator 140 and causes a memory (not shown) to store the acquired information. The speed controller 164 controls the travel driving force output device 200 or the brake device 210 on the basis of speed elements associated with the target trajectory stored in the memory. The steering controller 166 controls the steering device 220 in accordance with a level of curvature of the target trajectory stored in the memory. For example, processes of the speed controller 164 and the steering controller 166 are implemented by a combination of feed-forward control and feedback control. As an example, the steering controller 166 executes feed-forward control according to the curvature of the road in front of the host vehicle M and feedback control based on deviation from the target trajectory in combination.

The travel driving force output device 200 outputs a travel driving force (torque) for enabling the vehicle to travel to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second controller 160 or information input from the driving operator 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second controller 160 or the information input from the driving operator 80 so that brake torque according to a braking operation is output to each wheel. The brake device 210 may include a mechanism configured to transfer the hydraulic pressure generated by an operation of the brake pedal included in the driving operators 80 to the cylinder via a master cylinder as a backup. The brake device 210 is not limited to the above-described configuration and may be an electronically controlled hydraulic brake device configured to control the actuator in accordance with information input from the second controller 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second controller 160 or the information input from the driving operator 80 to cause the direction of the steerable wheels to be changed.

[Details of Processes of Setter and Controller]
(First Risk Area)

The setter 142 sets a first risk area including an area between a moving object and a first end of a crosswalk where the moving object is scheduled to arrive in the crosswalk when the moving object is entering the crosswalk which is provided in front of the host vehicle M and where the host vehicle M is scheduled to pass on the basis of the recognition result of the recognizer 130. The controller 144 prevents the vehicle from entering the first risk area when a first predetermined condition is satisfied.

The "moving object" includes a person, an animal, and the like. The moving object includes a pedestrian, a bicycle, a wheelchair, and the like. In the following description, it is assumed that the moving object is a pedestrian. The "first risk area" is an area where first risk potential is set. The "risk potential" is an index value indicating a risk level when the host vehicle M has entered the area where the risk potential is set. The first risk potential is risk potential which is an index value of a predetermined magnitude (an index value exceeding zero).

The first predetermined condition is that deceleration of the host vehicle M is less than a threshold value when it is assumed that the host vehicle M is controlled so that the host vehicle M does not enter the first risk area AR1. That is, the controller 144 prevents the host vehicle M from entering the first risk area AR1 when the deceleration of the host vehicle M is less than the threshold value (when a predetermined burden is not imposed on an occupant) and allows the host vehicle M to enter the first risk area AR1 when the deceleration of the host vehicle M is greater than or equal to the threshold value.

However, even if the first predetermined condition is not satisfied (even if the deceleration is greater than or equal to the threshold value or even if the host vehicle M is allowed to pass through the first risk area), the controller 144 does not allow the host vehicle M to enter a second risk area AR2 to be described below when it is determined that the host vehicle M cannot be allowed to enter the second risk area as a result of taking into account the second risk area (see FIG. 6 to be described below).

Figure 3:
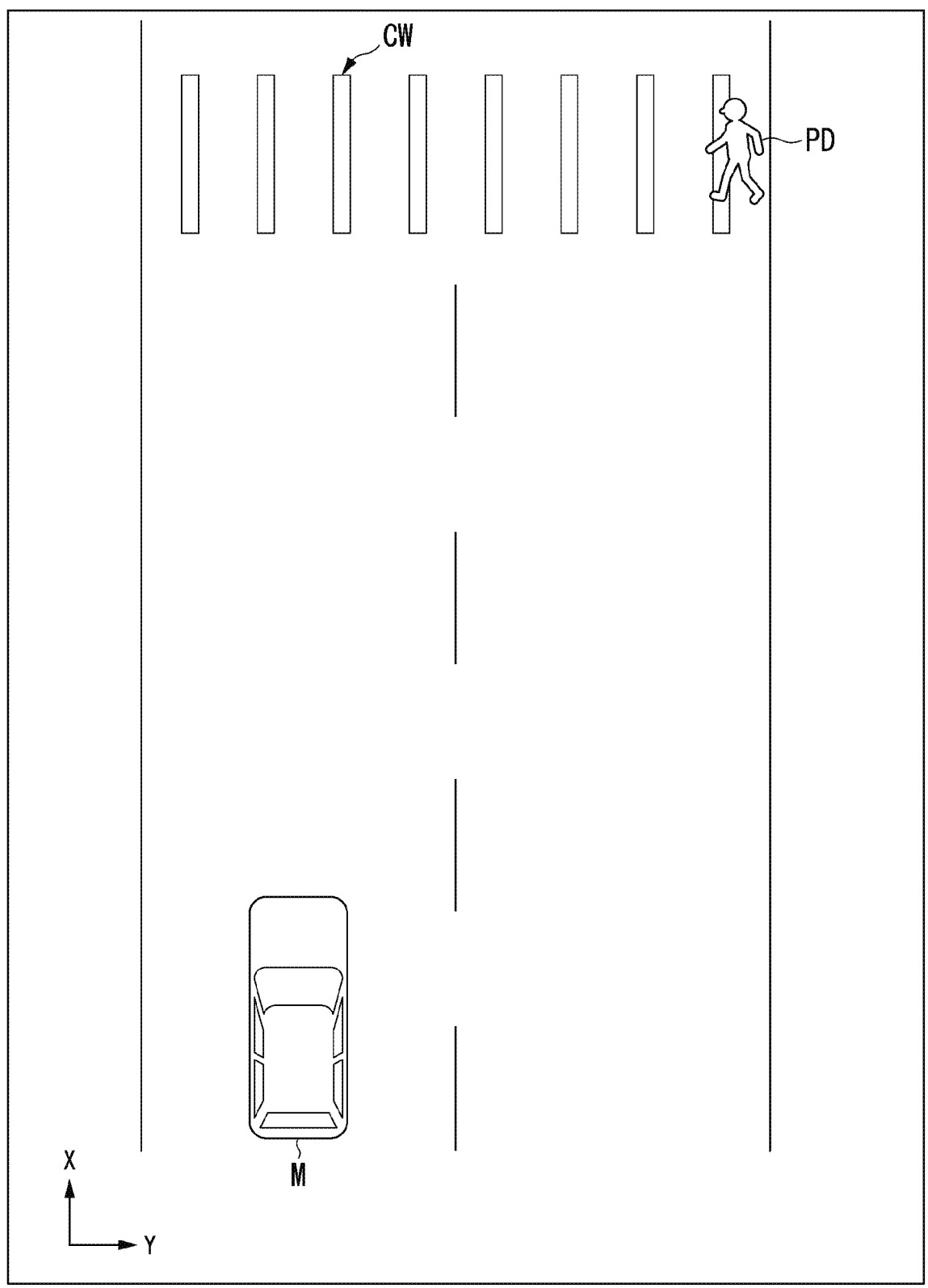
FIG. 3 is a diagram (part 1) for describing a first risk area.

The first risk area will be described with reference to FIGS. 3 to 5. FIG. 3 is a diagram (part 1) for describing the first risk area. Hereinafter, a traveling direction of the host vehicle M may be referred to as an X direction and a direction orthogonal to the X direction (a width direction of the host vehicle M) may be referred to as a Y direction. For example, when the pedestrian PD is present at the crosswalk CW in front of the host vehicle M, the first risk area is set.

Figure 4:
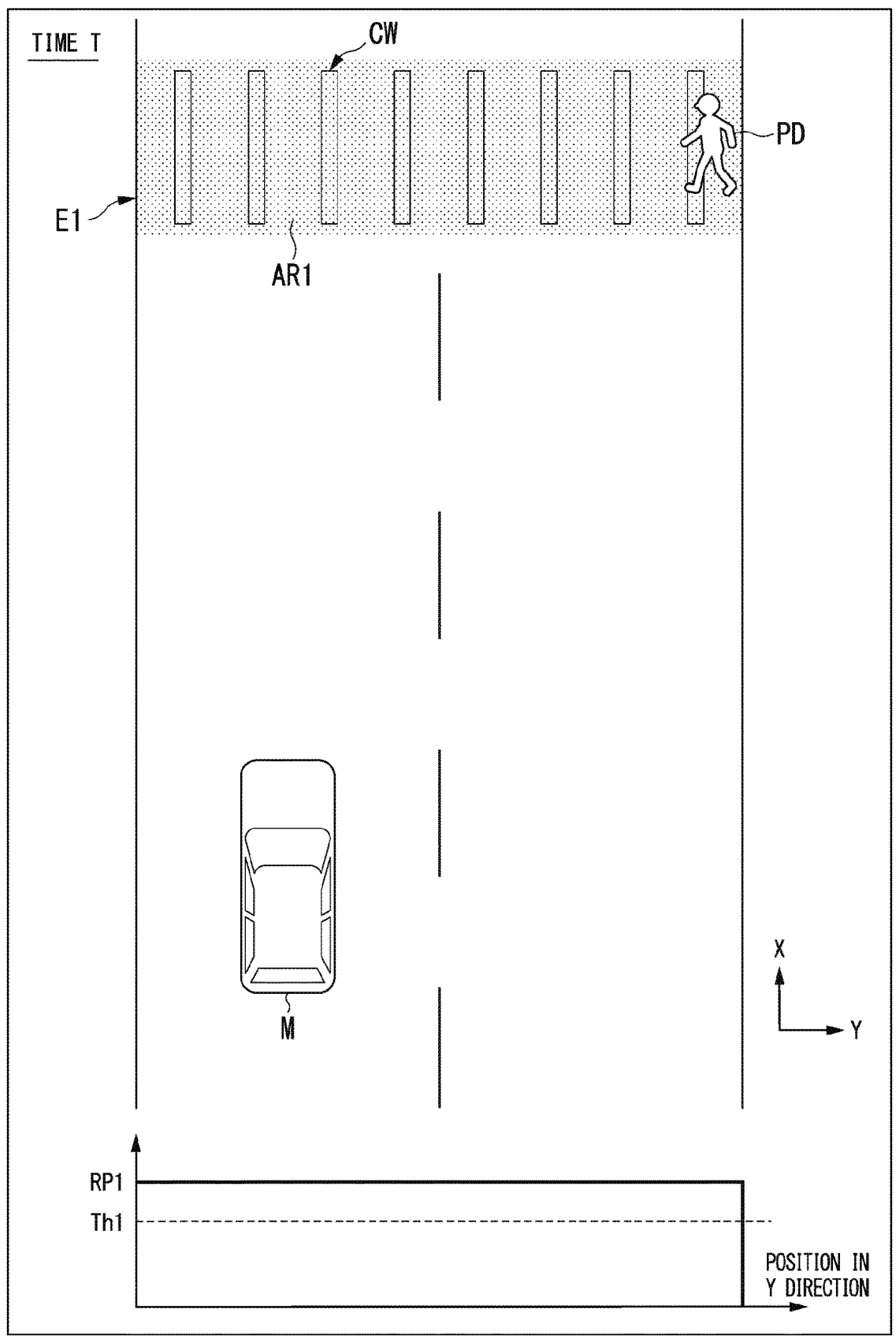
FIG. 4 is a diagram (part 2) for describing the first risk area.

FIG. 4 is a diagram (part 2) for describing the first risk area. The upper diagram of FIG. 4 shows an example of the first risk area AR1 in which the first risk potential is set and the lower diagram of FIG. 4 shows an example of a degree of the first risk potential. The horizontal axis in the lower diagram of FIG. 4 corresponds to a position of a crosswalk CW of a road in the Y direction and the vertical axis represents a magnitude of risk potential.

As shown in the upper diagram of FIG. 4, at time T, the setter 142 sets the first risk area AR1 including an area between the pedestrian PD and a first end E1 of the crosswalk CW when the pedestrian PD is entering the crosswalk CW.

As shown in the lower diagram of FIG. 4, the setter 142 sets the first risk potential (RP1) in the first risk area AR1 to a magnitude greater than or equal to a first threshold value Th1. When the risk potential is the first threshold value Th1, it is not preferable for the host vehicle M to enter the above area. For example, the magnitude of the first risk potential in the first risk area AR1 is uniform. In the following description, it is assumed that the first risk potential greater than or equal to the first threshold value Th1 is set in the first risk area AR1.

The controller 144 prevents the host vehicle M from entering the first risk area AR1 when the first predetermined condition is satisfied. For example, the controller 144 causes the host vehicle M to decelerate so that the host vehicle M stops in front of the first risk area AR1. When there is an area where the risk potential is less than the threshold value Th1, the controller 144 may control the steering so that the host vehicle M travels in that area.

As described above, the controller 144 executes appropriate control in consideration of a state of the host vehicle M, a surrounding environment, and the like so that the pedestrian PD can cross the crosswalk CW. Thereby, the controller 144 can perform more suitable driving with respect to the moving object around the host vehicle M and the occupant of the host vehicle M.

Figure 5:
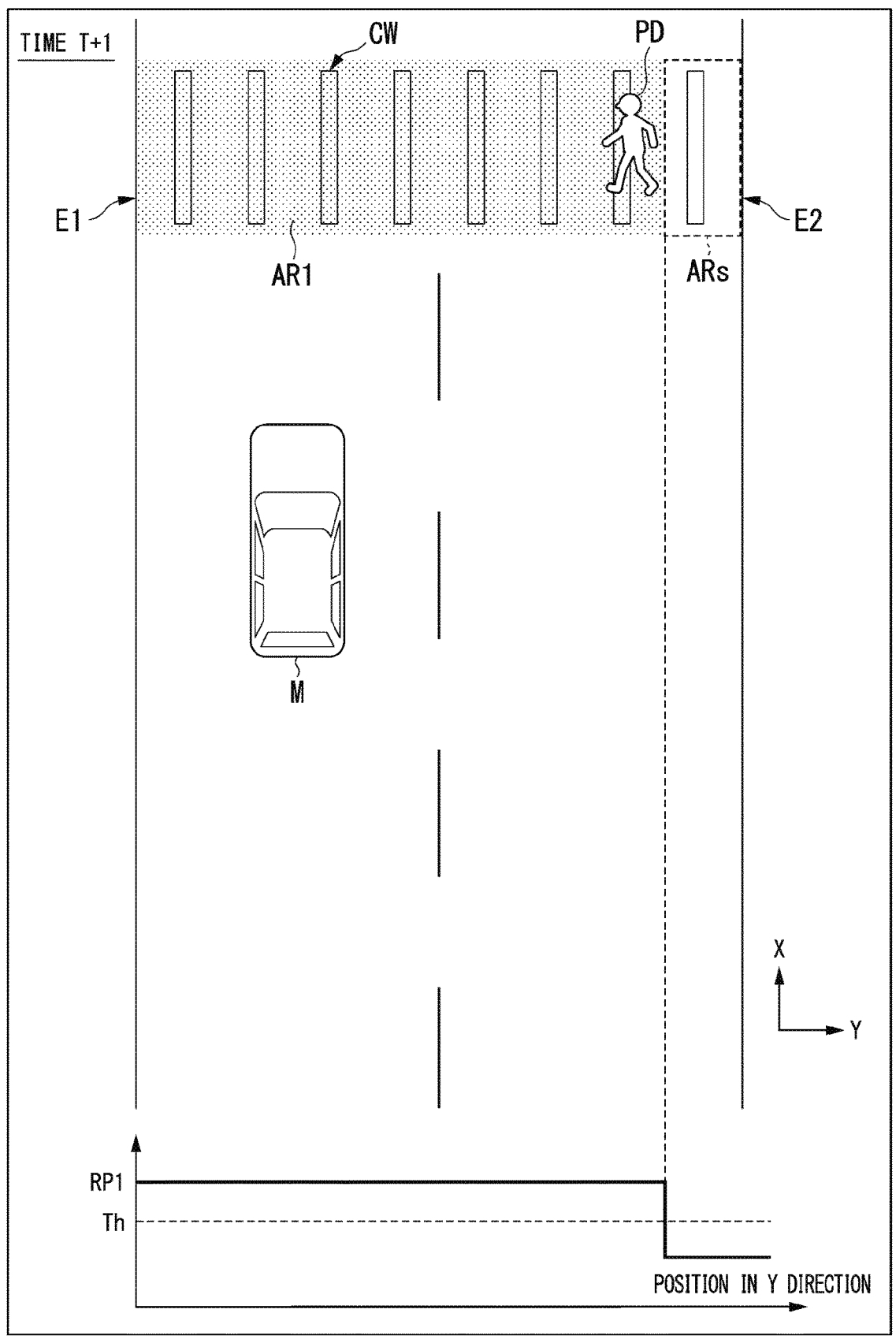
FIG. 5 is a diagram (part 3) for describing the first risk area.

FIG. 5 is a diagram (part 3) for describing the first risk area. Description similar to that of FIG. 4 will be omitted. As shown in the upper diagram of FIG. 5, at time T+1, when the pedestrian PD has moved toward the first end E1 side of the crosswalk CW, the setter 142 does not set the first risk area AR1 with respect to a specific area ARs including an area between the pedestrian PD and a second end E2 of the crosswalk CW. For example, the setter 142 sets risk potential less than the first threshold value Th1 with respect to the specific area ARs. The second end E2 is an end opposite to the pedestrian PD and the first end E1 in the crosswalk CW.

As described above, because the controller 144 does not set the first risk potential in the specific area ARs, the host vehicle M can appropriately pass through the specific area ARs in consideration of a surrounding traffic situation. Thereby, the controller 144 can reliably perform control according to a surrounding traffic situation.

(Second Risk Area)

Figure 6:
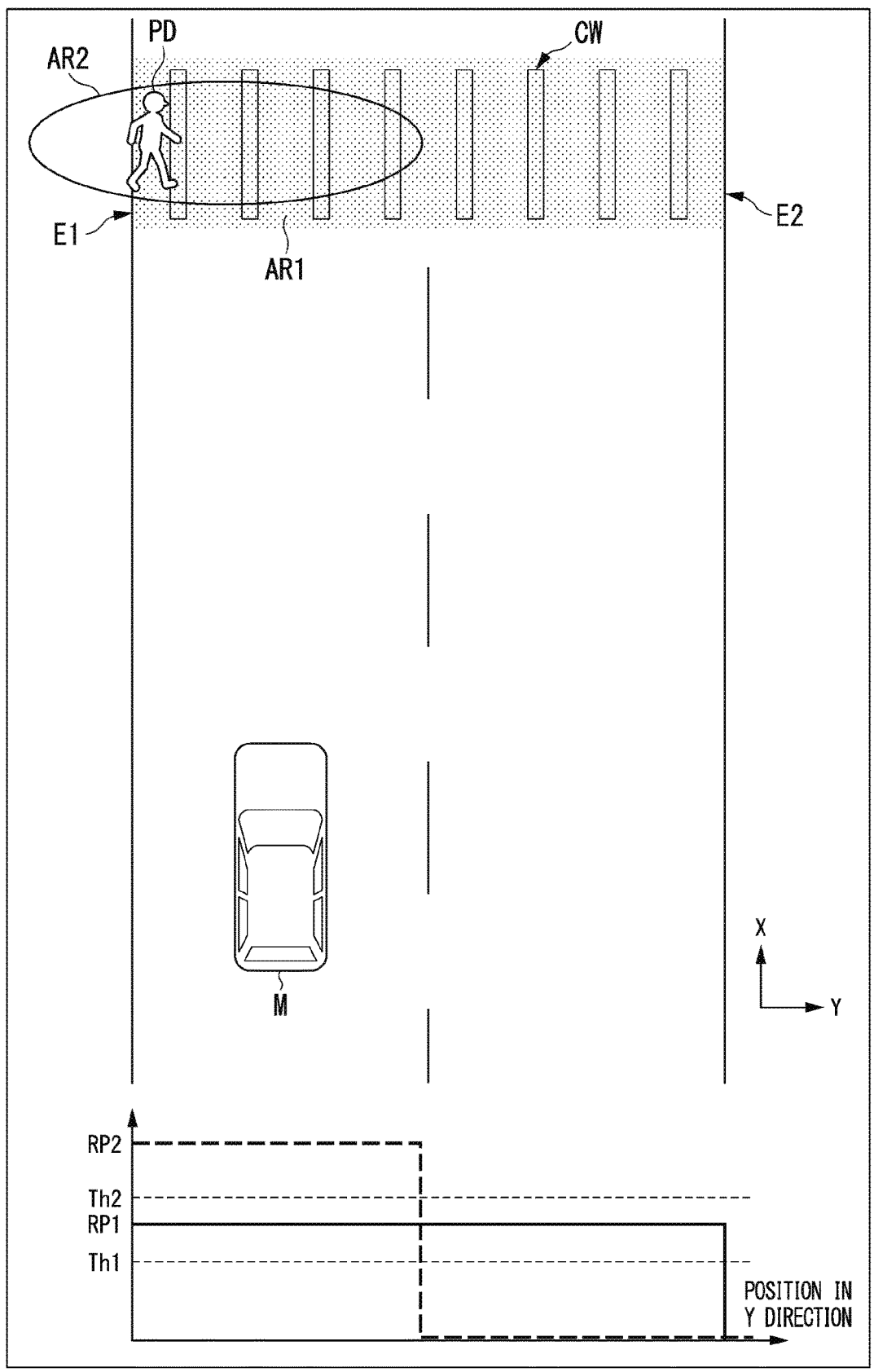
FIG. 6 is a diagram for describing a second risk area.

FIG. 6 is a diagram for describing the second risk area. Description similar to that of FIG. 4 and the like will be omitted. The setter 142 sets the second risk area AR2 including the pedestrian PD and located around the pedestrian PD on the basis of the presence of the pedestrian PD. The second risk area AR2 is an area where second risk potential (RP2) is set. The controller 144 controls the host vehicle M on the basis of the first risk potential and the second risk potential.

The "second risk potential" is an index indicating a risk due to the presence of a physical object around the host vehicle M. In the following description, it is assumed that the second risk potential greater than or equal to a second threshold value Th2 is set in the second risk area AR2. For example, the second risk potential may be set so that a central point of the physical object is set to have a maximum value, a value of the second risk potential decreases as a distance from the central point of the physical object increases, and the second risk potential becomes zero when the host vehicle M is sufficiently away from the physical object. The second risk potential may be set to be relatively high on the crosswalk CW side and low on the sidewalk side. The controller 144 causes the host vehicle M to travel in an area where the first risk potential and the second risk potential are not set or an area having risk potential less than or equal to a predetermined value.

As shown in the upper diagram of FIG. 6, the first risk area AR1 and the second risk area AR2 overlap and are set in the crosswalk CW. As shown in the lower diagram of FIG. 6, the second risk potential is set to be greater than or equal to the threshold value Th2 on a traveling trajectory of the host vehicle M. In this case, the controller 144 prevents the host vehicle M from entering the second risk area AR2. In other words, the controller 144 prevents the host vehicle M from entering the second risk area AR2 when it is assumed that the host vehicle M will enter the second risk area AR2 where the second risk potential greater than or equal to the threshold value Th2 is set, regardless of whether or not the deceleration of the host vehicle M is greater than or equal to the threshold value. For example, in this case, the controller 144 causes the host vehicle M to stop in front of the crosswalk CW.

As described above, the controller 144 can perform more suitable driving with respect to a moving object around the host vehicle M by controlling the host vehicle M so that the host vehicle M does not pass through the second risk area AR2 even if a condition for passing through the first risk area AR1 is satisfied.

FIG. 7 is a diagram for describing conditions when the host vehicle M stops in front of the crosswalk CW and when the host vehicle M passes through the crosswalk CW. If the first risk area AR1 where the first risk potential is set is present (when there is no interference with the second risk area), the host vehicle M passes through the first risk area AR1 when it is estimated that deceleration is greater than or equal to the first threshold value Th1 so that the host vehicle M stops. When it is estimated that the deceleration is not greater than or equal to the first threshold value Th1, the host vehicle M stops in front of the first risk area AR1.

When there is interference with the set second risk area AR2 where the second risk potential is set, the host vehicle M performs an operation in which the host vehicle M does not enter the second risk area AR2 even if it is estimated that the deceleration is greater than or equal to the first threshold value Th1 so that the host vehicle M stops. For example, the host vehicle M stops in front of the second risk area AR2.

Comparative Example

Figure 8:
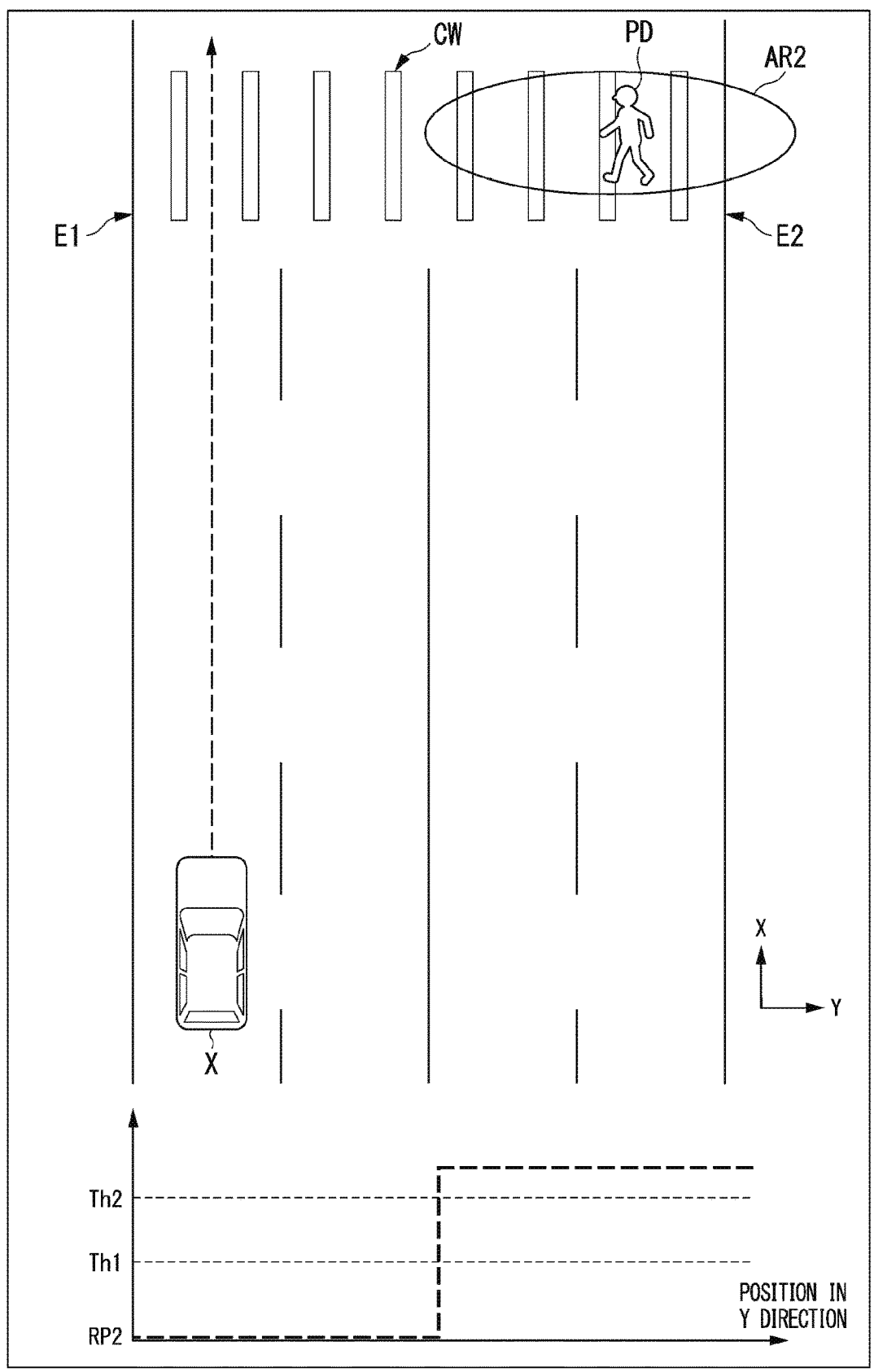
FIG. 8 is a diagram for describing a vehicle control device of a comparative example.

FIG. 8 is a diagram for describing a vehicle control device of a comparative example. The vehicle control device sets a second risk area AR2 without setting a first risk area AR1 even if a pedestrian PD is entering a crosswalk CW. In this case, the vehicle control device determines that a host vehicle X can pass through an area where a second risk potential is less than a threshold value Th2 (or less than a threshold value Th1). The vehicle control device causes the host vehicle X to pass through the crosswalk CW even in a situation in which the host vehicle X is safely stopped. Thus, the vehicle control device of the comparative example may perform traveling which is not suitable with respect to a moving object such as a pedestrian PD.

Present Embodiment

Figure 9:
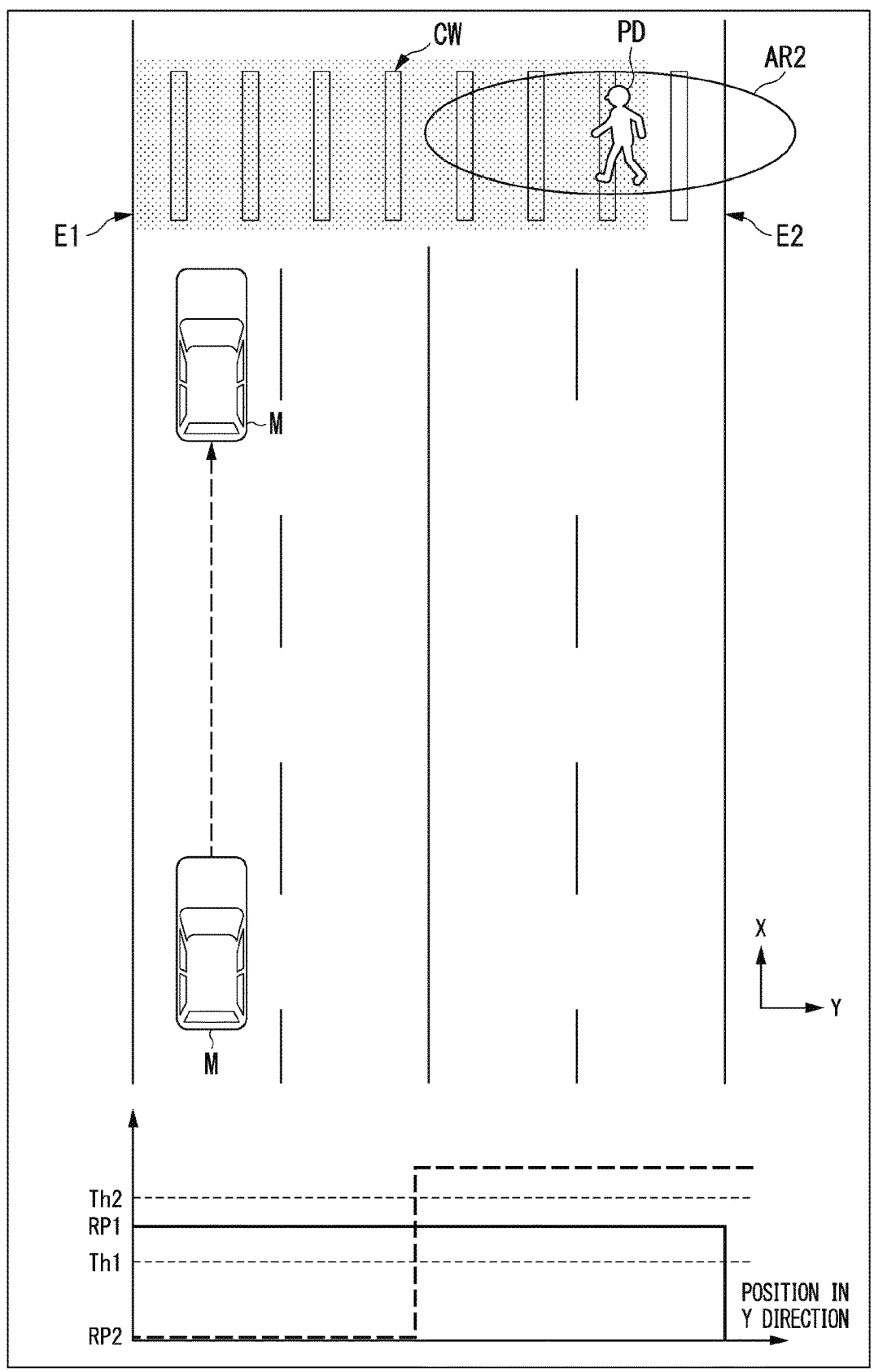
FIG. 9 is a diagram for describing control of the host vehicle M of an automated driving control device according to the present embodiment.

On the other hand, the automated driving control device 100 of the present embodiment controls the host vehicle M so that the host vehicle M stops in front of the first risk area AR1 in which the first risk potential is set as shown in FIG. 9. When the host vehicle M stops in this manner, a moving object such as the pedestrian PD can safely cross the crosswalk CW. The automated driving control device 100 can perform more suitable traveling with respect to the moving object.

[Flowchart (Part 1)]

Figure 10:
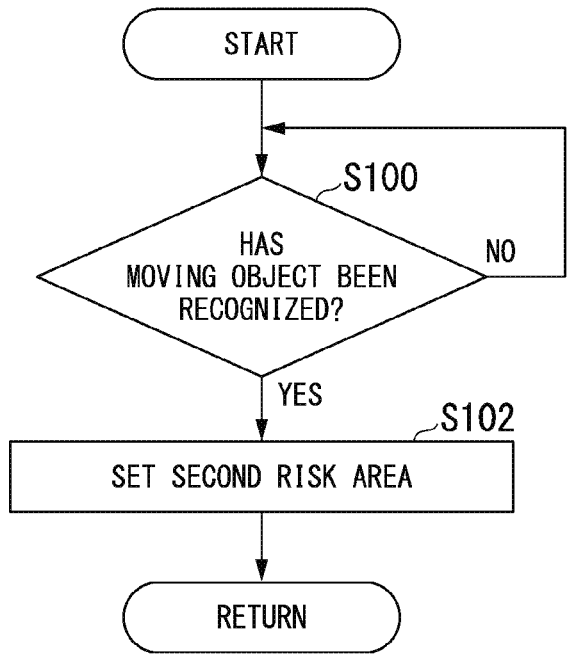
FIG. 10 is a flowchart (part 1) showing an example of a flow of a process executed by a setter.

FIG. 10 is a flowchart (part 1) showing an example of a flow of a process executed by the setter 142. First, the setter 142 determines whether or not a moving object around the host vehicle M has been recognized (step S100). When a moving object around the host vehicle M has been recognized, the setter 142 sets the second risk area AR2 where the second risk potential is set with respect to the recognized moving Object (Step S102). Thereby, the Process of One Routine of the Present Flowchart Ends.

[Flowchart (Part 2)]

Figure 11:
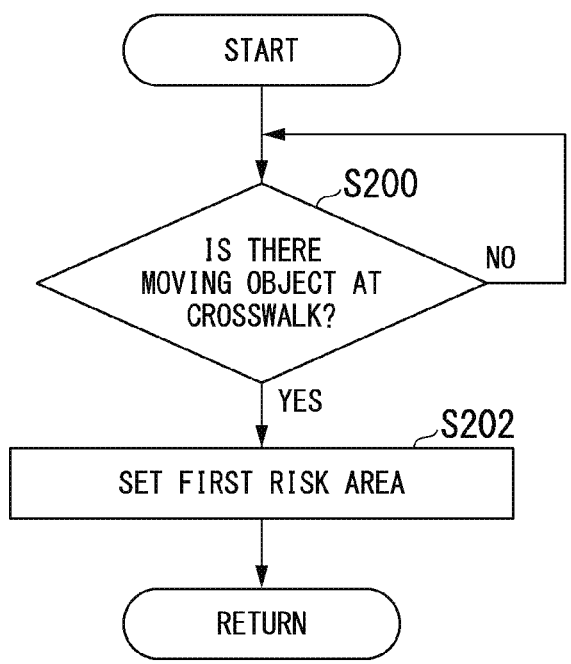
FIG. 11 is a flowchart (part 2) showing an example of a flow of a process executed by the setter.

FIG. 11 is a flowchart (part 2) showing an example of a flow of a process executed by the setter 142. First, the setter 142 determines whether or not there is a moving object at the crosswalk CW (step S200). When there is a moving object at the crosswalk CW, the setter 142 sets the first risk area AR1 where the first risk potential is set (step S202). Thereby, the process of one routine of the present flowchart ends.

The first risk area AR1 and the second risk area AR2 are set as described above and the process using these areas is executed as will be described below.

[Flowchart (Part 3)]

Figure 12:
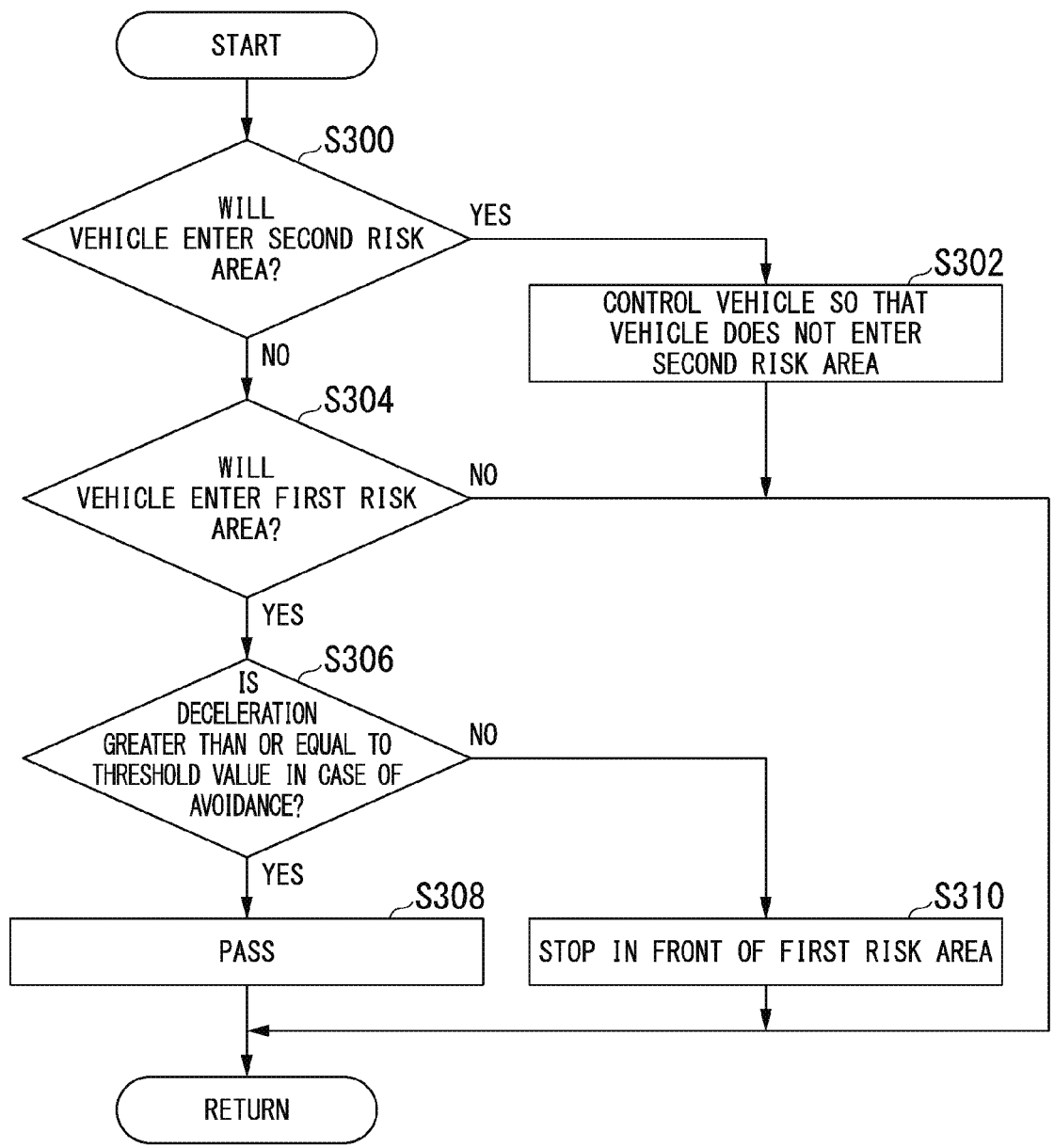
FIG. 12 is a flowchart showing an example of a flow of a process executed by a controller.

FIG. 12 is a flowchart showing an example of a flow of a process executed by the controller 144. First, the controller 144 estimates whether or not the host vehicle M will enter the second risk area AR2 within a predetermined time period (step S300). When it is estimated that the vehicle will enter the second risk area AR2 within the predetermined time period, the controller 144 controls the host vehicle M so that the host vehicle M does not enter the second risk area AR2 (step S302). In this case, when the first risk area AR1 is present, the controller 144 controls the host vehicle M so that the host vehicle M does not enter the first risk area AR1 and the second risk area AR2. Thereby, the process of one routine of the present flowchart ends.

When it is estimated that host vehicle M will not enter the second risk area AR2 within the predetermined time period (or when the second risk area AR2 is not present), the controller 144 estimates whether or not the host vehicle M will enter the first risk area AR1 within the predetermined time period (step S304). When it is estimated that the host vehicle M will not enter the first risk area AR1 within the predetermined time period, the process of one routine of the present flowchart ends.

When it is estimated that the host vehicle M will enter the first risk area AR1 within the predetermined time period, the controller 144 estimates whether or not the deceleration of the host vehicle M is greater than or equal to a threshold value if an operation of entering the first risk area AR1 is avoided (step S306). When it is estimated that the deceleration of the host vehicle M is greater than or equal to the threshold value if an operation of entering the first risk area AR1 is avoided, the controller 144 causes the host vehicle M to pass through the first risk area AR1 (step S308). When it is estimated that the deceleration of the host vehicle M is not greater than or equal to the threshold value if the operation of entering the first risk area AR1 is avoided, the controller 144 causes the host vehicle M to stop in front of the first risk area AR1 (step S310). Thereby, the process of one routine of the present flowchart ends.

According to the first embodiment described above, the controller 144 can perform more suitable driving with respect to a moving object by controlling the host vehicle M so that the host vehicle M does not enter the first risk area AR1 when the first predetermined condition is satisfied. This also reduces a burden on an occupant.

Second Embodiment

A second embodiment will be described below. A case in which the first risk area AR1 is set when the moving object is entering the crosswalk CW has been described in the first embodiment. In the second embodiment, a first risk area AR1 is set when a moving object is estimated to enter a crosswalk CW. Hereinafter, differences from the first embodiment will be mainly described.

Figure 13:
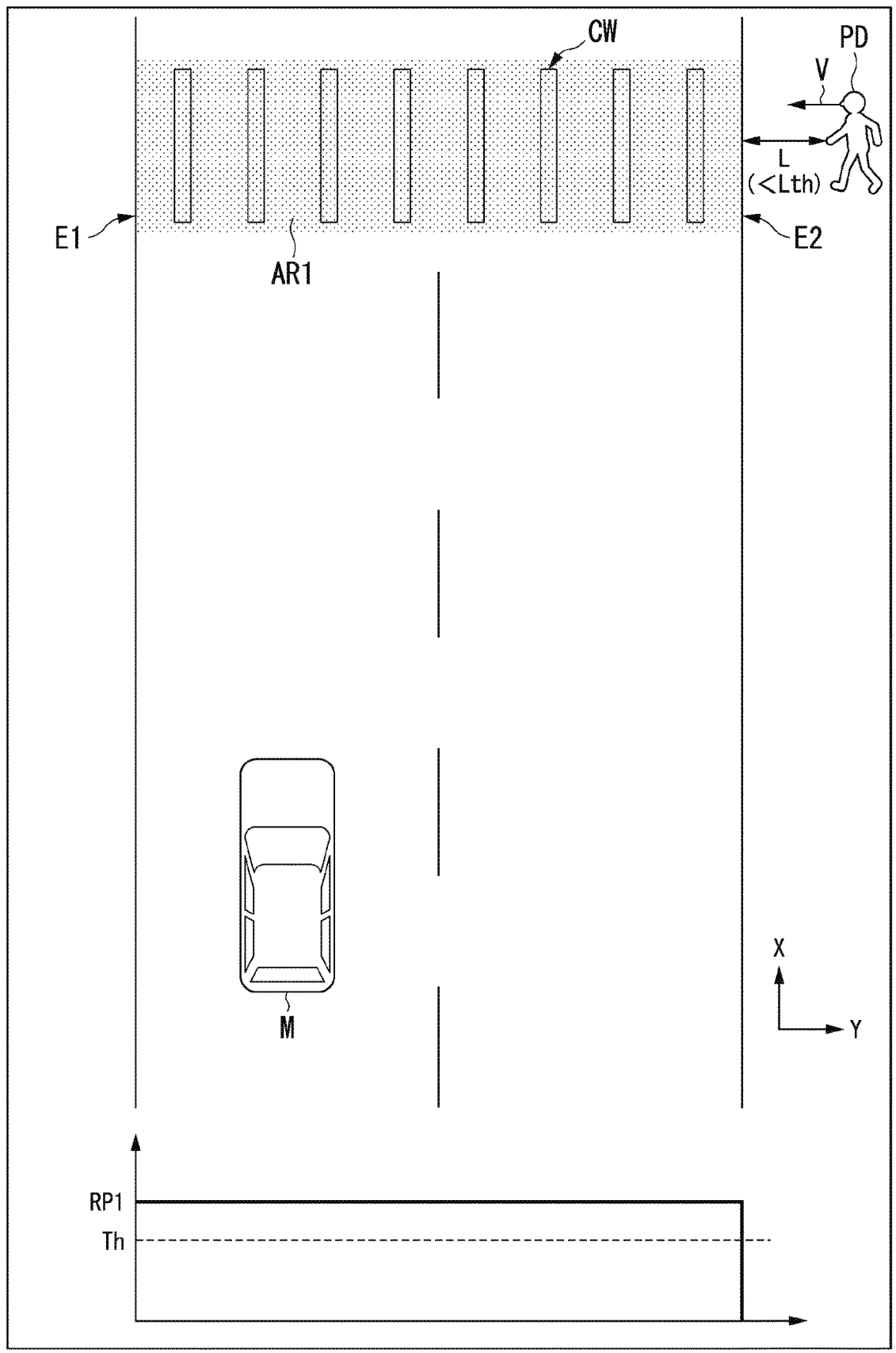
FIG. 13 is a diagram for describing a process of a setter according to a second embodiment.

FIG. 13 is a diagram for describing a process of a setter 142 according to the second embodiment. When it is determined that the moving object is about to enter the crosswalk CW, the setter 142 sets the first risk area AR1 where first risk potential is set. For example, when one or more of the following conditions are satisfied, the setter 142 determines that the moving object is about to enter the crosswalk CW.

(1) A shortest distance L between the moving object and the crosswalk CW is less than or equal to a distance Lth.

(2) A direction of a reference vector of the moving object is directed toward the crosswalk CW. The "reference vector" is a direction in which the moving object is moving or a direction in which a face or a body of the moving object is directed. The "direction of the reference vector being directed toward the crosswalk CW" means, for example, that the reference vector reaches or approaches the crosswalk CW when extended.

As described above, the setter 142 sets the first risk area AR1 when the moving object is estimated to enter the crosswalk CW, so that the control of the host vehicle M according to an intention of the moving object can be implemented.

Figure 14:
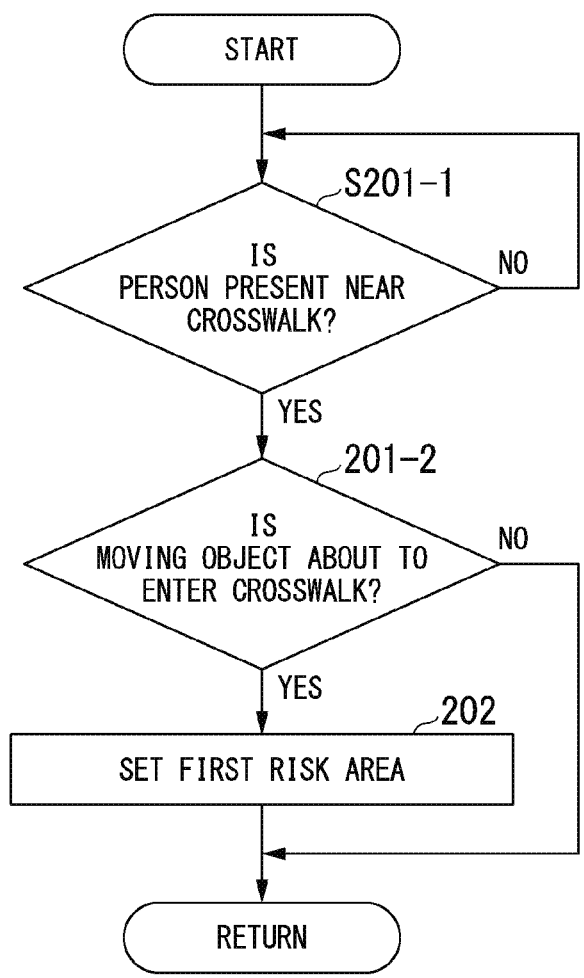
FIG. 14 is a flowchart showing an example of a flow of a process executed by the setter according to the second embodiment.

FIG. 14 is a flowchart showing an example of a flow of a process executed by the setter 142 according to the second embodiment. In the second embodiment, the present flowchart is applied in place of the flowchart (part 1) of the first embodiment.

First, the setter 142 determines whether or not a moving object is present near the crosswalk CW (step S201-1). When a moving object is present near the crosswalk CW, the setter 142 determines whether or not the moving object is about to enter the crosswalk CW (step S201-2). When the moving object has not entered the crosswalk CW, the process of one routine of the present flowchart ends. When the moving object is about to enter the crosswalk CW, the setter 142 sets the first risk area AR1 (step S202). Thereby, the process of one routine of the present flowchart ends.

The controller 144 prevents the host vehicle M from entering the first risk area AR1 when a second predetermined condition is satisfied and causes the host vehicle M to pass through the first risk area AR1 when the second predetermined condition is not satisfied. The second predetermined condition is that the deceleration related to the host vehicle M is less than a threshold value when it is assumed that the host vehicle M is controlled so that the host vehicle M does not enter the first risk area AR1. The threshold value of the second predetermined condition may be the same as or different from the threshold value of the first predetermined condition.

As described above, the setter 142 can quickly control the host vehicle M in accordance with an intention of the moving object. The host vehicle M can quickly stop in front of the first risk area AR1. As a result, the automated driving control device 100 can implement more suitable traveling with respect to the moving object.

Figure 15:
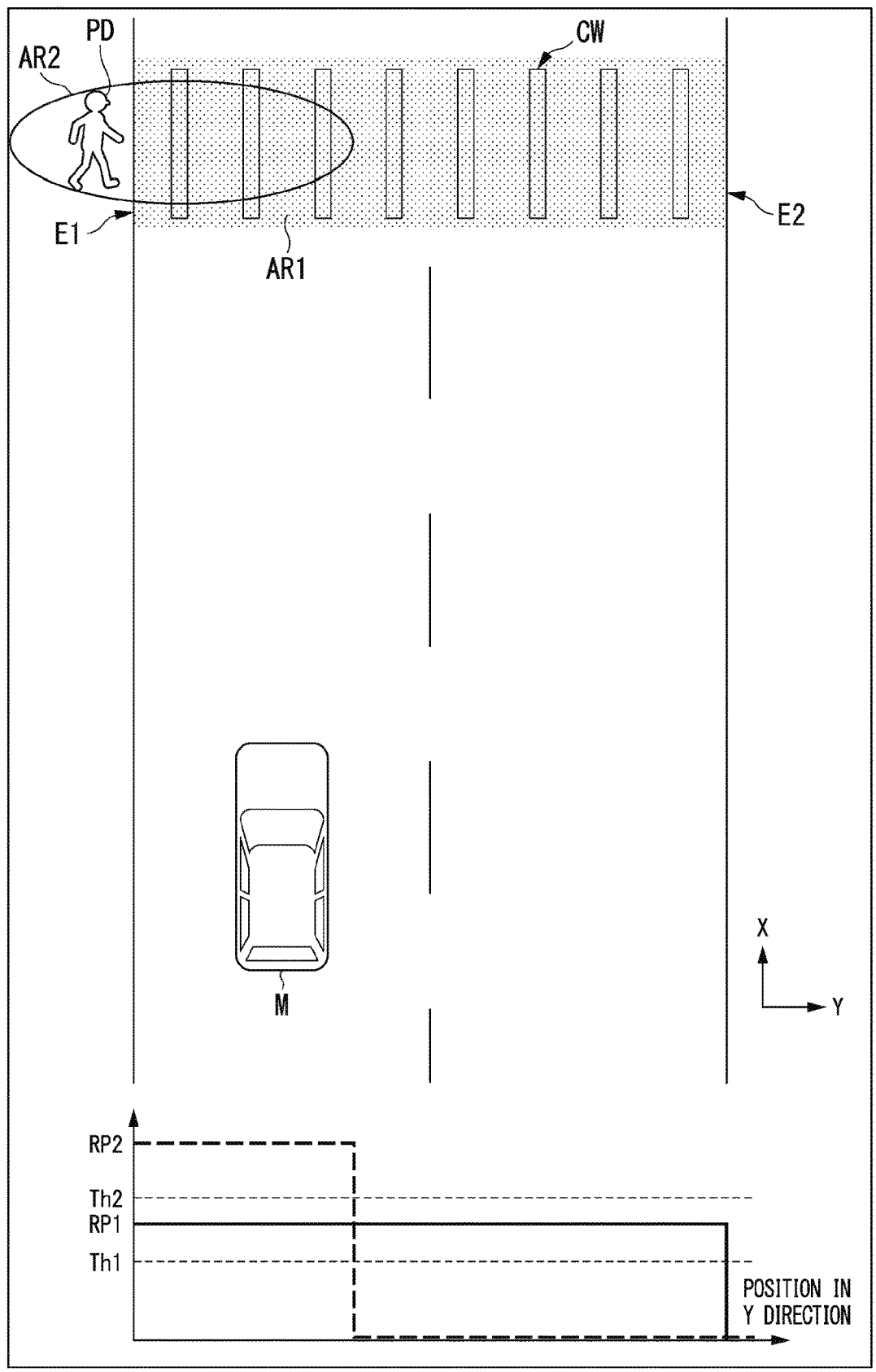
FIG. 15 is a diagram for describing a process when a moving object is estimated to enter a crosswalk CW.

FIG. 15 is a diagram for describing a process when the moving object is estimated to enter the crosswalk CW. For example, when it is estimated that a pedestrian PD near a first end E1 enters the crosswalk CW, the setter 142 sets a second risk area AR2. This second risk area AR2 overlaps the first risk area AR1. The controller 144 prevents the host vehicle M from passing through the second risk area AR2 even if the second predetermined condition is not satisfied (even if the deceleration is greater than or equal to the threshold value or even if the host vehicle M is allowed to pass through the first risk area). The setter 142 may set the second risk area AR2 as shown in FIG. 15 when the moving object is present at the crosswalk CW. In this manner, the automated driving control device 100 can perform more suitable traveling with respect to the moving object when the moving object is present near the crosswalk CW.

According to the second embodiment described above, the automated driving control device 100 can implement more suitable traveling in consideration of an intention of a moving object by setting the first risk area AR when the moving object is about to enter a crosswalk and preventing the host vehicle M from entering the first risk area AR when the second predetermined condition is satisfied.

[Hardware Configuration]

Figure 16:
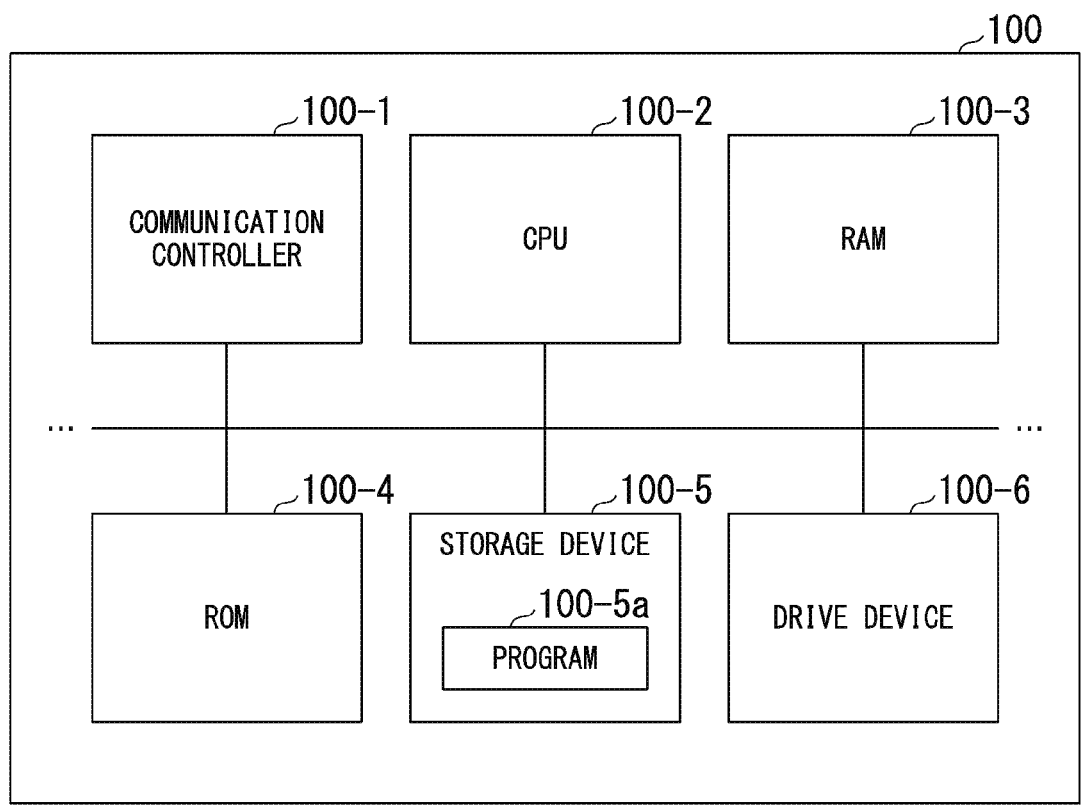
FIG. 16 is a diagram showing an example of a hardware configuration of an automated driving control device according to an embodiment.

FIG. 16 is a diagram showing an example of a hardware configuration of the automated driving control device 100 according to the embodiment. As shown in FIG. 16, the automated driving control device 100 has a configuration in which a communication controller 100-1, a CPU 100-2, a random access memory (RAM) 100-3 used as a working memory, a read only memory (ROM) 100-4 storing a boot program and the like, a storage device 100-5 such as a flash memory or a hard disk drive (HDD), a drive device 100-6, and the like are mutually connected by an internal bus or a dedicated communication line. The communication controller 100-1 communicates with components other than the automated driving control device 100. The storage device 100-5 stores a program 100-5a to be executed by the CPU 100-2. This program is loaded into the RAM 100-3 by a direct memory access (DMA) controller (not shown) or the like and executed by the CPU 100-2. Thereby, some or all of the recognizer 130, the setter 142, and the controller 144 are implemented.

The above-described embodiment can be implemented as follows.

A vehicle control device including:
a storage device storing a program; and
a hardware processor,
wherein the hardware processor executes the program stored in the storage device to:
recognize a surrounding environment of a vehicle;
set a first risk area in a surrounding area of the vehicle on the basis of a recognition result;
control at least one of a speed and steering of the vehicle;
set the first risk area so that the first risk area includes an area between the moving object and a first end of a crosswalk where the moving object is scheduled to arrive in the crosswalk when the moving object is entering the crosswalk which is provided in front of the vehicle and where the vehicle is scheduled to pass on the basis of the recognition result; and
prevent the vehicle from entering the first risk area when a first predetermined condition is satisfied.

Although modes for carrying out the present invention have been described using embodiments, the present invention is not limited to the embodiments and various modifications and substitutions can also be made without departing from the scope and spirit of the present invention.

What is claimed is:

1. A vehicle control device comprising:
a hardware processor executing software, hardware including circuitry, or a cooperation of the software and the hardware, configured to operate as:
a recognizer configured to recognize a surrounding environment of a vehicle;
a setter configured to set a first risk area in a surrounding area of the vehicle on the basis of a recognition result of the recognizer; and
a controller configured to control at least one of a speed and steering of the vehicle,
wherein the setter sets the first risk area to a crosswalk which is provided in front of the vehicle and where the vehicle is scheduled to pass when a moving object is entering the crosswalk on the basis of the recognition result of the recognizer or when the moving object is about to enter the crosswalk on the basis of the recognition result of the recognizer,
wherein the controller prevents the vehicle from entering the first risk area when a first predetermined condition is satisfied,
wherein the controller allows the vehicle to enter the first risk area when the first predetermined condition is not satisfied,
wherein the first risk area comprises all of the crosswalk or the first risk area comprises a first area, the first area comprises the moving object, a first end point in a longitudinal direction of the crosswalk, and an area between the moving object and the first end point, the first end point is opposite of a second end point in the longitudinal direction of the crosswalk, the second end point is an end point of the crosswalk closer to the moving object than the first end point, and
wherein the first predetermined condition is that deceleration related to the vehicle is less than a threshold value when it is assumed that the vehicle is controlled so that the vehicle does not enter the first risk area.

2. The vehicle control device according to claim 1,
wherein the setter sets a second risk area including the moving object and located around the moving object on the basis of a presence of the moving object and wherein the controller controls the vehicle on the basis of the first risk area and the second risk area.

3. The vehicle control device according to claim 2,
wherein the first predetermined condition is that deceleration related to the vehicle is less than the threshold value when it is assumed that the vehicle is controlled so that the vehicle does not enter the first risk area, and
wherein the controller prevents the vehicle from entering the second risk area when it is assumed that the vehicle will enter the second risk area in a state in which the first predetermined condition is not satisfied.

4. The vehicle control device according to claim 1, wherein the setter sets the first risk area so that the first risk area does not include a specific area between the moving object and a second end opposite to the first end in the crosswalk.

5. The vehicle control device according to claim 1,
wherein the setter sets the first risk area when the moving object is about to enter the crosswalk, and
wherein the controller prevents the vehicle from entering the first risk area when a second predetermined condition is satisfied.

6. A vehicle control method comprising:
recognizing, by a computer, a surrounding environment of a vehicle, resulting in a recognition result;
setting, by the computer, a first risk area in a surrounding area of the vehicle on the basis of the recognition result;
controlling, by the computer, at least one of a speed and steering of the vehicle;
setting, by the computer, the first risk area to a crosswalk which is provided in front of the vehicle and where the vehicle is scheduled to pass when a moving object is entering the crosswalk based on the recognition result or when the moving object is about to enter the crosswalk based on the recognition result;
preventing, by the computer, the vehicle from entering the first risk area when a first predetermined condition is satisfied; and
allowing, by the computer, the vehicle to enter the first risk area when the first predetermined condition is not satisfied,
wherein the first risk area comprises all of the crosswalk or the first risk area comprises a first area, the first area comprises the moving object, a first end point in a longitudinal direction of the crosswalk, and an area between the moving object and the first end point, the first end point is opposite of a second end point in the longitudinal direction of the crosswalk, the second end point is an end point of the crosswalk closer to the moving object than the first end point, and
wherein the first predetermined condition is that deceleration related to the vehicle is less than a threshold value when it is assumed that the vehicle is controlled so that the vehicle does not enter the first risk area.

7. A non-transitory storage medium storing a program for causing a computer to execute processing steps of:
recognizing a surrounding environment of a vehicle, resulting in a recognition result;
setting a first risk area in a surrounding area of the vehicle on the basis of the recognition result;
controlling at least one of a speed and steering of the vehicle;
setting the first risk area to a crosswalk which is provided in front of the vehicle and where the vehicle is scheduled to pass when a moving object is entering the crosswalk on the basis of the recognition result or when the moving object is about to enter the crosswalk on the basis of the recognition result;
preventing the vehicle from entering the first risk area when a first predetermined condition is satisfied; and
allowing the vehicle to enter the first risk area when the first predetermined condition is not satisfied,
wherein the first risk area comprises all of the crosswalk or the first risk area comprises a first area, the first area comprises the moving object, a first end point in a longitudinal direction of the crosswalk, and an area between the moving object and the first end point, the first end point is opposite of a second end point in the longitudinal direction of the crosswalk, the second end point is an end point of the crosswalk closer to the moving object than the first end point, and
wherein the first predetermined condition is that deceleration related to the vehicle is less than a threshold value when it is assumed that the vehicle is controlled so that the vehicle does not enter the first risk area.

8. The vehicle control device according to claim 1,
wherein the setter does not set the first risk area to the crosswalk when the moving object is about to travel across an area different from the crosswalk in a road that the vehicle is traveling without passing the crosswalk of the road.

9. The vehicle control device according to claim 1,
wherein the setter sets the first risk area to the crosswalk even when it is assumed that the vehicle does not interfere with the moving object when the vehicle arrives at the crosswalk based on a future position of the vehicle and a future position of the moving object.

10. The vehicle control device according to claim 1,
wherein the setter sets a second risk area including the moving object and located around the moving object on the basis of a presence of the moving object and
(i) wherein the controller prevents the vehicle from entering an overlap area where the first risk area and the second risk area overlap without considering the deceleration related to the vehicle when it is assumed that the vehicle enters the second risk area in a case in which the moving object is entering the crosswalk or the moving object is about to enter the crosswalk,
(ii) wherein the controller controls the vehicle so that the vehicle passes an area different from the overlap area in the first risk area when it is assumed that the vehicle does not enter the second risk area and enters the first risk area, and the first predetermined condition is not satisfied in a case in which the moving object is entering the crosswalk or the moving object is about to enter the crosswalk, and
(iii) wherein the controller causes the vehicle to stop in front of the crosswalk when it is assumed that the vehicle does not enter the second risk area and enters the first risk area, and the first predetermined condition is satisfied in a case in which the moving object is entering the crosswalk or the moving object is about to enter the crosswalk.

* * * * *